US011347917B2

(12) United States Patent
Ahuja et al.

(10) Patent No.: US 11,347,917 B2
(45) Date of Patent: May 31, 2022

(54) DETERMINING AND VERIFYING METASTABILITY IN CLOCK DOMAIN CROSSINGS

(71) Applicant: Synopsys, Inc., Mountain View, CA (US)

(72) Inventors: Deepak Ahuja, Delhi (IN); Anchit Jain, Uttar Pradesh (IN); Paras Mal Jain, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/316,610

(22) Filed: May 10, 2021

(65) Prior Publication Data

US 2021/0350053 A1     Nov. 11, 2021

Related U.S. Application Data

(60) Provisional application No. 63/023,230, filed on May 11, 2020.

(51) Int. Cl.
*G06F 30/327*     (2020.01)
*G06F 30/3312*     (2020.01)
(Continued)

(52) U.S. Cl.
CPC ........ *G06F 30/327* (2020.01); *G06F 30/3312* (2020.01); *G06F 30/396* (2020.01);
(Continued)

(58) Field of Classification Search
CPC ............... G06F 30/327; G06F 30/3312; G06F 30/3315; G06F 30/396; G06F 30/398; G06F 2119/12; G06F 2119/02; G06F 2117/04
(Continued)

(56) References Cited

U.S. PATENT DOCUMENTS 7,073,146 B2   7/2006   Sarwary et al.
7,289,946 B1*   10/2007   Lee ................ G01R 31/318594
                                                      703/16

(Continued)

OTHER PUBLICATIONS

"Clock domain crossing: guidelines for design and verification success", https://www.techdesignforums.com/practice/tag/clock-domain-crossing/, Sep. 1, 2008, 4 pages. (Year: 2008).*

*Primary Examiner* — Phallaka Kik
(74) *Attorney, Agent, or Firm* — Haynes Beffel & Wolfeld LLP; Andrew Dunlap

(57) ABSTRACT

The technology disclosed relates to verifying metastability for a clock domain crossing (CDC) in a circuit design. The technology disclosed may include, for a destination clock domain in the circuit design, creating a circuit graph based, at least in part, on the circuit design. The circuit graph includes start points and stop points. The start points may be data inputs, clocks, and enables of the destination clock domain. The stop points may be synchronizer outputs of the destination clock domain and a source clock domain in the circuit design. The technology disclosed may also include traversing the circuit graph to mark all graph nodes that reside in a source-destination path of the CDC. Based on the marked graph nodes, the start points, and the stop points, the technology disclosed may also include propagating destination domain qualifiers on the circuit graph within an allowed sequential depth.

20 Claims, 5 Drawing Sheets

(51) Int. Cl.
  *G06F 30/3315* (2020.01)
  *G06F 30/396* (2020.01)
  *G06F 30/398* (2020.01)
  *G06F 119/12* (2020.01)
  *G06F 119/02* (2020.01)
  *G06F 117/04* (2020.01)
(52) U.S. Cl.
  CPC ........ *G06F 30/3315* (2020.01); *G06F 30/398* (2020.01); *G06F 2117/04* (2020.01); *G06F 2119/02* (2020.01); *G06F 2119/12* (2020.01)
(58) Field of Classification Search
  USPC .......................... 716/108, 113, 136; 703/16
  See application file for complete search history.

(56) References Cited

U.S. PATENT DOCUMENTS

| | | | |
|---|---|---|---|
| 7,536,662 B2 | 5/2009 | Sarwary et al. | |
| 7,779,286 B1* | 8/2010 | Pritchard | G06F 30/30 713/400 |
| 8,095,717 B1* | 1/2012 | White | G06F 3/0656 710/306 |
| 8,458,544 B2* | 6/2013 | Wang | G01R 31/318552 714/731 |
| 9,474,034 B1* | 10/2016 | Baumgartner | H04L 7/08 |
| 9,722,767 B2* | 8/2017 | Simpson | H04L 12/40 |
| 10,769,008 B1* | 9/2020 | Arias Drake | G06F 11/0724 |
| 10,935,595 B1* | 3/2021 | Vimjam | G06F 11/07 |
| 10,936,774 B1* | 3/2021 | Katzir | G06F 30/398 |
| 2002/0120896 A1* | 8/2002 | Wang | G01R 31/318594 714/731 |
| 2005/0251779 A1* | 11/2005 | Chard | G06F 30/30 716/108 |
| 2007/0230645 A1* | 10/2007 | Ly | G06F 30/33 375/354 |
| 2007/0288874 A1* | 12/2007 | Czeck | G06F 30/30 716/102 |
| 2008/0069277 A1* | 3/2008 | Derti | G06F 30/33 375/354 |
| 2010/0194436 A1* | 8/2010 | Iwashita | G06F 30/3312 326/94 |
| 2010/0199244 A1* | 8/2010 | Kwok | G06F 30/3323 716/113 |
| 2010/0242003 A1* | 9/2010 | Kwok | G06F 30/30 716/106 |
| 2010/0287524 A1* | 11/2010 | Ly | G06F 30/33 716/113 |
| 2011/0063931 A1* | 3/2011 | Linam | G06F 13/1689 365/193 |
| 2012/0180015 A1* | 7/2012 | Mneimneh | G06F 30/3323 716/113 |
| 2013/0239080 A1* | 9/2013 | Sarwary | G06F 30/33 716/113 |
| 2014/0075257 A1* | 3/2014 | Wang | G06F 30/30 714/731 |
| 2015/0161312 A1* | 6/2015 | Drasny | G06F 30/30 716/108 |
| 2015/0192950 A1* | 7/2015 | Tubbs | G06F 1/12 713/400 |
| 2016/0139622 A1* | 5/2016 | Barner | G06F 1/04 713/600 |
| 2016/0148661 A1* | 5/2016 | Keller | G11C 8/16 365/189.05 |
| 2021/0018969 A1* | 1/2021 | Srivastava | G06F 1/04 |

* cited by examiner

DETERMINING AND VERIFYING METASTABILITY IN CLOCK DOMAIN CROSSINGS

RELATED APPLICATION

This application claims priority to U.S. Provisional Application No. 63/023,230 titled VERIFYING METASTABILITY IN CLOCK DOMAIN CROSSING, filed on 11 May 2020.

TECHNICAL FIELD

The present invention relates to verifying metastability in clock domain crossing in electronic circuits. In particular, the present invention relates to verifying whether metastability will be present in logic components of a circuit as a result of a signal crossing from one clock domain to another clock domain.

BACKGROUND

As electronic circuits increase in design size and complexity, so does the number of multiple and independent clocks in the circuits. In digital electronics, a clock domain crossing (CDC) is the traversal of a signal in a synchronous digital circuit from one clock domain into another. In terms of electronic elements, a clock domain crossing is a path from a sequential logic element or other source of state transitions in a circuit design in a first clock domain to a sequential element in a second clock domain. If a signal does not assert long enough and is not registered by an element, the signal may appear asynchronous on the incoming clock boundary. For example, a clock in the first clock domain may operate asynchronously with respect to a clock in the second clock domain. In such cases, when a data signal path crosses from the first clock domain to the second clock domain, the crossing is referred to as an asynchronous clock domain crossing. A process of testing and verifying signals transferred across portions of an electronic circuit associated with such asynchronicity, known as clock domain crossing (CDC) verification, can cause metastability in various components of the circuit. CDC verification can be used for circuit design flow to determine whether a CDC is synchronized or not. Structural verification and functional verification techniques, described below, have been used for CDC verification.

Metastability may result if a digital electronics system persists for an unbounded time in an unstable equilibrium or metastable state. In digital logic circuits, a digital signal is required to be within certain voltage or current limits to represent a '0' or '1' logic level for correct circuit operation. If the signal is within a forbidden intermediate range, it may cause faulty behavior in logic gates to which the signal is applied. In metastable states, the circuit may be unable to settle into a stable '0' or '1' logic level within the time required for proper circuit operation. As a result, the circuit can act in unpredictable ways, and may lead to a system failure.

Structural verification of CDCs can be categorized into two categories known as control path CDCs and data path CDCs. Structures for control path CDCs are well defined to determine whether they will cause metastability. Metastability analysis of data path CDCs are based on design structure analysis, which may be protocol-dependent (e.g., FIFO/Handshake) or protocol-independent (e.g., structural analysis of interaction between control path CDCs and data path CDCs).

Challenges with these above-described approaches may include false violations/noise, debuggability, and scalability. False violations/noise problems with respect to CDCs may arise if there are a large number of CDCs and there are not any substantial design issues. The actual CDC issues may be a much smaller percentage of reported CDC issues, for which a design change is unable to determine or fix. Debuggability challenges may arise if design tools do not provide a root cause of the CDC issues to the user and thus the user cannot fix the CDC issues. Scalability problems may arise if there are multiple ways to achieve the same or similar functionality (e.g., FIFO implementation). Accordingly, even with continuous research and development, addressing CDC issues remains a challenge.

Functional verification is performed using verification engines to verify properties and CDC issues. Challenges may arise with the functional verification approach because functional verification tools may either report a significant number of non-conclusive properties or may end up performing an abstraction, resulting in design intent being abstracted.

SUMMARY

In some embodiments, a method of determining or verifying metastability for a CDC in a circuit design includes identifying a first element in the circuit design as a source of the CDC, selecting a second element in the circuit design to be a qualifier that corresponds to the source, and determining a blocking value of the qualifier that can functionally block the source. As a result of determining the blocking value, the method further includes identifying the CDC as being a synchronized crossing where metastability is not produced as a result of the CDC, and providing a user interface with information regarding at least one of the qualifier. Such information may include that of the blocking value of the qualifier, the CDC, and the source. The information may allow a user to compare the circuit design with the source being blocked to the circuit design with the source being unblocked.

The method may also include identifying a third element in the circuit design as a second source of a second CDC and searching for a candidate qualifier that can functionally block the second source. As a result of failing to find the candidate qualifier, the method may include identifying the second CDC as having an unsynchronized crossing where metastability is produced as a result of the second CDC in a fourth element in the circuit design.

The CDC comprises a signal path between the first element, which is operated by a first clock, and a circuit element that is operated by a second clock, which is asynchronous with respect to the first clock.

In some embodiments, a method of verifying metastability for a clock domain crossing (CDC) in a circuit design may include, for a destination clock domain in the circuit design, creating a circuit graph (e.g., a strongly connected component graph) based, at least in part, on the circuit design. The circuit graph includes start points and stop points. The start points may be data inputs, clocks, and enables of the destination clock domain. The stop points may be synchronizer outputs of the destination clock domain and a source clock domain in the circuit design. The method may also include traversing the circuit graph to mark all graph nodes that reside in a source-destination path of the CDC. Based on the marked graph nodes, the start points, and the stop points, the method may also include propagating destination domain qualifiers on the circuit graph within an allowed sequential depth. In some embodiments, the method may further include, after all destination domain qualifiers are propagated, performing a value propagation of qualifier blocking values on components of the circuit graph for each qualifier.

In some embodiments, the method may further include, for each of the destination domain qualifiers, performing a dynamic synchronization analysis on each deterministic gate (e.g., AND, OR, NAND, NOR, and so on) by analyzing the gate structures and incoming signals, which may be a (i) source, (ii) qualifier, (iii) destination domain signal, (iv) unconstrained port signal, or (v) another qualifier of the destination clock domain. Interaction among incoming signals on that gate are also analyzed. This analysis may determine whether the source can be directly blocked by a qualifier or by propagated blocking values of the qualifier. On the other hand, propagation of a qualifier blocking value may involve allowing the blocking value to pass through a gate, if an input of the gate is driven by a blocking value of a qualifier and other inputs of the gate are driven by (i) a destination domain signal, (ii) an unconstrained port signal or (iii) another qualifier of the destination clock.

In some embodiments, the method may further include, for each of the destination domain qualifiers for a multiplexer gate (MUX), performing a dynamic synchronization analysis, such that the MUX blocks the source input if one input of the MUX is a source input and another input of the MUX is a (i) destination domain signal, (ii) unconstrained port signal, or (iii) another qualifier of the destination clock domain, and a select pin of the MUX is driven by a qualifier or blocking value of the qualifier. On the other hand, propagation of a qualifier blocking value may include allowing the blocking value to pass through the MUX, if one input of the MUX is the blocking value of the qualifier and another input and the select pin of the MUX are driven by the (i) destination domain signal, (ii) unconstrained port signal, or (iii) another qualifier of the destination clock domain.

In some embodiments, the method may further include propagating multiple sources across the circuit graph to determine the sources that are not blocked by the qualifier. If a constant value obtained from the qualifier value propagation is propagated to a destination input graph node, then the method may include marking all the crossings for that destination for which the particular qualifier is valid as being synchronized. In some embodiments, the method may further include performing a depth first search (DFS) to determine if the constant value is propagated on individual graph nodes. If the constant value is propagated on an individual graph node, then the method may include blocking all of the sources passing through the individual graph node for which the particular qualifier is valid.

In some embodiments, the method may further include determining unsynchronized sources by propagating all the sources from the inputs of the individual graph node to the current node if the constant value is not propagated on the individual graph node or the sources are not blocked by the qualifier or the propagated value of the qualifier, as per the method described above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
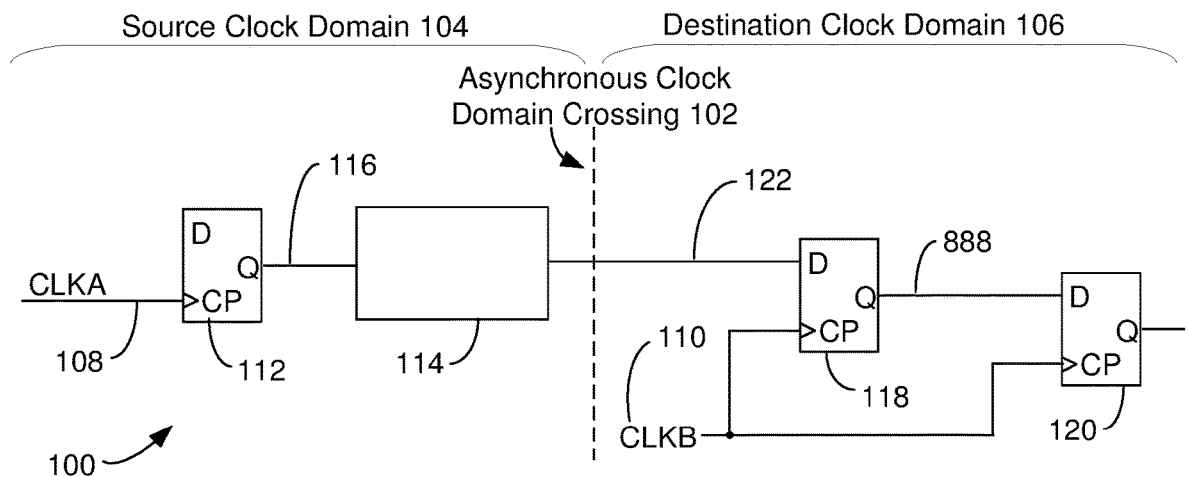
FIG. 1 illustrates an example electronic circuit that includes an asynchronous clock domain crossing.

Embodiments described herein relate to, among other things, verifying metastability in clock domain crossings.

Many digital integrated circuit designs generally use a universal clock signal to synchronize their operation to ensure that the state of a changing logic signal is only sampled after settling to its new value. Various circuit designs, however, may include multiple independent clocks. Moreover, chips and systems on chips continue to increase in complexity, comprising many systems and subsystems that may have multiple clock domains. A clock domain is a set of sequential logic elements (e.g., circuit elements), such as transparent latches and flip-flops, and combinational logic associated with these sequential logic elements that are clocked by a common clock or by clocks having a common frequency and a fixed phase relationship. A clock signal generally causes a change in the state of sequential logic, such as a flip-flop or transparent latch. A clock domain crossing is a path from a sequential logic element or other source of state transitions in a circuit design in a first clock domain to a sequential element in a second clock domain. The clock in the first domain may operate asynchronously with respect to the second clock domain. Two clock domains are operating asynchronously with respect to one another if their respective clock signals do not have a fixed phase and frequency relationship with each other, and neither domain is in a hold state. In such cases, when a data signal path crosses from the first clock domain to the second clock domain, the crossing is referred to as an asynchronous clock domain crossing.

Asynchronous clock signals at clock domain crossings can reach different logic elements at slightly different times in each cycle, leading to a timing uncertainty that can cause random set-up and hold-time violations in a circuit design. Such a timing uncertainty may in turn lead to a metastability that causes a functional failure. For example, metastability may occur if a signal exists in an indeterminate range (outside of an expected range), which can lead to a logic component to be in a state between 0 and 1. As a result of the logic component not being in a 0 or a 1, the circuit, including the logic component, will generally perform in unpredictable ways. Thus, asynchronous clock domain crossings may be sources of errors in chip operation, for example.

The number of asynchronous clock domain crossings has continued to grow for modern processor and system-on chip (SoC) designs. For example, modern designs may have over 100,000 individual asynchronous crossing endpoints. This makes any approach that requires manual intervention expensive and likely to impact project schedules, for example.

Electronic design automation (EDA) tools may be used to evaluate chip designs prior to fabrication. The EDA process broadly involves two steps. The first step is a check of the register transfer level (RTL) design logic. The second step is a creation of a physical circuit design from the RTL design. The first step, checking the design logic, may be referred to as RTL design checking, which may use a language such as VHDL (Very High-Speed Integrated Circuit Hardware Description Language) or Verilog to describe and model the logical behavior of a circuit. RTL design checking itself may be decomposed into two steps: static checking, in which the structure of the design is analyzed without simulating its behavior; and dynamic checking, also referred to as verification, in which the behavior of the design is simulated or analyzed using formal verification techniques.

Asynchronous clock domain crossings (CDCs) are notorious for causing bugs and verification escapes in hardware designs due to the difficulty they impose in verifying pre-silicon. CDCs are generally difficult to verify because their behavior is fundamentally nondeterministic and affected by physical delays, clock phase relationships, and possibly synthesis optimizations, which are typically not modeled accurately in functional simulation environments.

Due to these problems, specialized tools have been developed to analyze RTL designs, identify asynchronous crossings, characterize them, and sometimes graphically illustrate them. This has allowed a designer to review the crossings in a design, to determine if they are intentional or not. These tools may attempt to verify the correctness of crossings as well. For example, a tool may perform static checks, which are checks that can be performed by the tool itself by merely analyzing the structure of the design.

Generally, however, conventional tools require manual intervention, to review and approve or disapprove of reported crossings, and filter out false failures. This is because current approaches typically attempt to infer the properties to be checked from commonly accepted "rules of thumb", or by attempting to recognize "design patterns" within the design to determine designer intent. However, in real designs there are often legitimate exceptions made to these common rules or patterns.

The above-described challenges may be overcome by using an automatic determination of blocking values of qualifiers to check for metastability arising from clock domain crossings as part of a verification process for a circuit. Specifically, techniques disclosed herein may automatically determine the blocking values of qualifiers that can functionally block a source of a data path causing crossing in, for example, electronic circuits. Such techniques may provide an advantage in that they may be protocol-independent, design structure-independent, and a memory/runtime-like structural analysis may be performed.

When a qualifier can block the source of the data path, the data path crossing may be considered as having a synchronized crossing such that metastability will not be present. Herein, a qualifier is a signal that controls or qualifies a data path crossing to a state where the data path crossing does not create metastability. Qualifiers may be either user-specified signals or double-flop/sync-cell single-bit or multi-bit signals in the destination clock domain, with the clock of the source clock domain being the same as that of the source clock domain of CDC crossings. Specifically, qualifiers are potential signals that can block the sources. This approach analyzes interactions between crossing paths, such as a qualifier path and a merge path (e.g., both crossing and qualifier path) interaction in a design. Accordingly, a crossing path from source to destination is analyzed to determine operating values based on gate types and signal types.

Embodiments described herein generally relate to the field of circuit design, and, more particularly, to EDA tools to perform static checking of asynchronous clock domain crossings in an RTL design of a chip or a system on a chip.

FIG. 1 illustrates an example electronic circuit 100 that includes an asynchronous clock domain crossing 102. One portion of electronic circuit 100 is a source clock domain 104 and another portion is a destination clock domain 106. Source clock domain 104 operates with a clock signal CLKA 108 and destination clock domain 106 operates with a clock signal CLKB 110. A flip-flop 112 in source clock domain 104 is referred to as a transmit element because it is the source of a signal at source clock domain 104 of asynchronous clock domain crossing 102. CLKA 108 is referred to as the transmit clock because CLKA 108 governs state changes associated with flip-flop 112. The transmit clock (e.g., CLKA 108), the transmit element (e.g., flip-flop 112), and combinational logic 114 each belong to source clock domain 104. A signal that is on line 116, which is the first signal originating in source clock domain 104 that can induce state transitions, is referred to as a transmit data signal.

Flip-flop 118 in destination clock domain 106 is a receive element because it is a sequential logic element at the receiving end of asynchronous clock domain crossing 102. Flip-flop 120, also in destination clock domain 106, can be referred to as a stage two element. Flip-flop 118 may also be referred to as a stage one element because it is the first flip-flop in destination clock domain 106 reached by the path from source clock domain 104. If electronic circuit 100 included subsequent flip-flops after flip-flop 120, for example, such flip-flops could be referred to as stage 3, 4, and N elements, respectively. CLKB 110 is referred to as the receive clock since the receive element (e.g., flip-flop 118) is clocked by CLKB 110. Elements 110, 118, and 120 are in destination clock domain 106.

Combinational logic 114 may produce an output signal onto line 122 based, at least in part, on a signal that is on line 116. The signal that is on line 122 is referred to as a receive data signal, since receive element 118 samples the receive data signal. In other words, a receive data signal is the signal that the receive element (e.g., flip-flop 118) samples when its clock input is active or (if edge-triggered) has an active edge. Flip-flops 118 and 120 constitute a synchronizer and constitute a metastability path, which is a path from the receive element (e.g., flip-flop 118) to a stage two element and possibly to additional stages, depending on the probability of metastability propagating through the path.

An interface between a first clock domain (e.g., 104) and a second clock domain (e.g., 106) that operates asynchronously to the first clock domain is referred to as an asynchronous interface. An asynchronous interface is one or more asynchronous crossings that collectively implement a protocol to transmit information from one clock domain to another. Such an interface generally comprises one or more control crossings and optionally one or more data crossings.

An asynchronous control crossing involves a signal that crosses from the first clock domain to the second clock domain, wherein the signal is provided to logic (e.g., a flip-flop) that may react immediately to transitions from the first clock domain. An asynchronous data crossing is an asynchronous crossing in which a signal is provided to logic that might not react immediately to transitions through the transmit path. For example, a crossing is an asynchronous data crossing if a signal is transmitted from the first clock domain to the second clock domain, wherein the signal is received by a logic component (e.g., a multiplexer) that may not react immediately to the received signal because the logic component samples the received signal when it receives a selection signal from another logic component.

Figure 2:
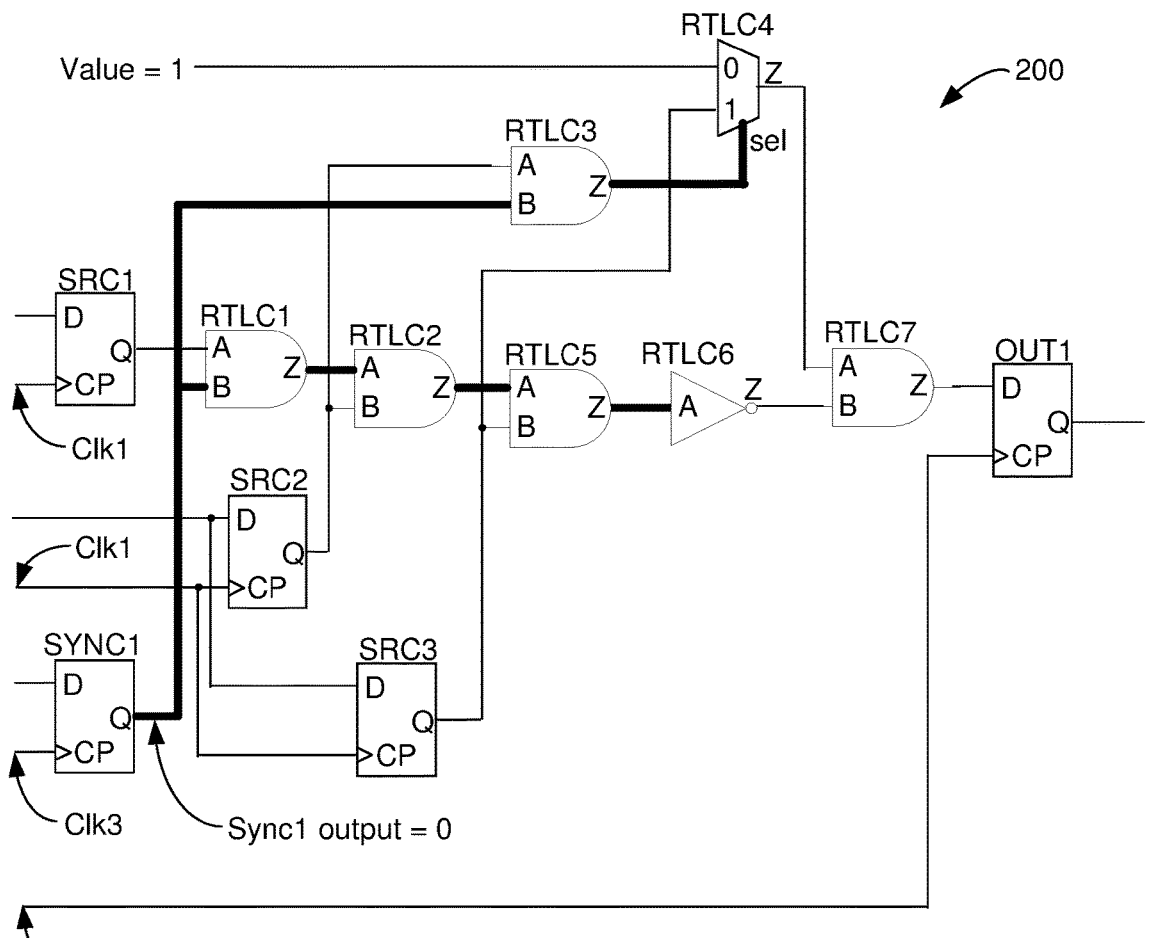
FIG. 2 illustrates various electronic components of a circuit and various blocking sources applied to the electronic components, according to embodiments.

FIG. 2 illustrates a circuit 200 that includes various electronic components and various blocking sources applied to the electronic components, according to embodiments. In particular, circuit 200 includes flip-flops SRC1, SYNC1, SRC2, SRC3, and OUT1. SRC1, SRC2, and SRC3 behave as sources in circuit 200, for example. Circuit 200 also includes AND gates RTLC1, RTLC2, RTLC3, RTLC5, and RTLC7. Finally, circuit 200 includes a NOT gate RTLC6 and a multiplexer RTLC4. Flip-flop SRC1 operates with a clock Clk1 applied to the clock input CP of the flip-flop. Flip-flop SRC2 operates with clock Clk1 applied to the clock input CP of the flip-flop. Flip-flop OUT1 operates with a clock Clk3 applied to the clock input CP of the flip-flop. Flip-flop SYNC1 operates with clock Clk3 applied to the clock input CP of the flip-flop. SYNC1 may produce a qualifier having three data path crossings. As explained above, a qualifier is a signal that controls or qualifies a data path crossing to a state where the data path crossing does not create metastability. If a qualifier can block a source of the data path, the data path crossing may be considered as having a synchronized crossing such that metastability will not be present. In part, because of this feature, a synchronizer may be called a qualifier. In the case for circuit 200, SYNC1 can block SRC1 at AND gate RTLC1 to control the D input on flip-flop OUT1. This corresponds to a data path crossing in a path from SRC1 to OUT1. SYNC1 can also block SRC2 at AND gate RTLC2 to control the D input on flip-flop OUT1. This corresponds to a data path crossing in a path from SRC2 to OUT1. SYNC1 can also block SRC3 at both AND gate RTLC3 and at multiplexer RTLC4 to control the D input on flip-flop OUT1. This corresponds to a data path crossing in a path from SRC3 to OUT1. For example, as illustrated in FIG. 2, a blocking value of logic 0 from SYNC1 results in AND gate RTLC1 blocking source SRC1, AND gate RTLC2 and AND gate RTLC5 blocking source SRC2, and AND gate RTLC5 and multiplexer RTLC4 blocking source SRC3 from reaching the destination of OUT1.

Gate-type circuit elements (e.g., deterministic gates) may block sources while the functionality of signal-type circuit elements may vary based on inputs of deterministic gates. For example, an AND gate may block a source at an input of the AND gate regardless of the logic values of the other input(s) of the AND gate. Thus, if an input to a deterministic gate is a qualifier, then the output of the deterministic gate is a blocking value (e.g., if the input of the deterministic gate is only a qualifier, the blocking value is on the output of the gate). In contrast, whether a source is blocked or not blocked by a MUX (e.g., a signal-type circuit element) generally depends on the logic values of the select input (e.g., pin) of the MUX and does not depend directly on any of the data inputs of the MUX. In another example, if one input to a deterministic gate is a qualifier and another input is a source, then a blocking value for a qualifier is intrinsically determined, so that the source is blocked at the particular gate. This determined value is propagated to the output of the deterministic gate. In another example, if an input to a deterministic gate is a destination domain signal, then the gate can act as passthrough logic for remaining inputs to propagate through this gate. Thus, propagated blocking values of the qualifiers are analyzed at each gate to determine whether the sources are blocked on all paths, which ensures crossings are safe/synchronized.

In various embodiments, a processor may perform RTL design checking, which may generally be decomposed into two parts, the first being static checking, in which the processor analyzes the structure of the design without simulating its behavior. The second part may be dynamic checking (e.g., verification), in which the processor simulates or analyzes the behavior of the design using formal verification techniques. Accordingly, a process for determining blocking values of qualifiers may be categorized into two parts, which are qualifier blocking value propagation and source propagation.

Figure 3:
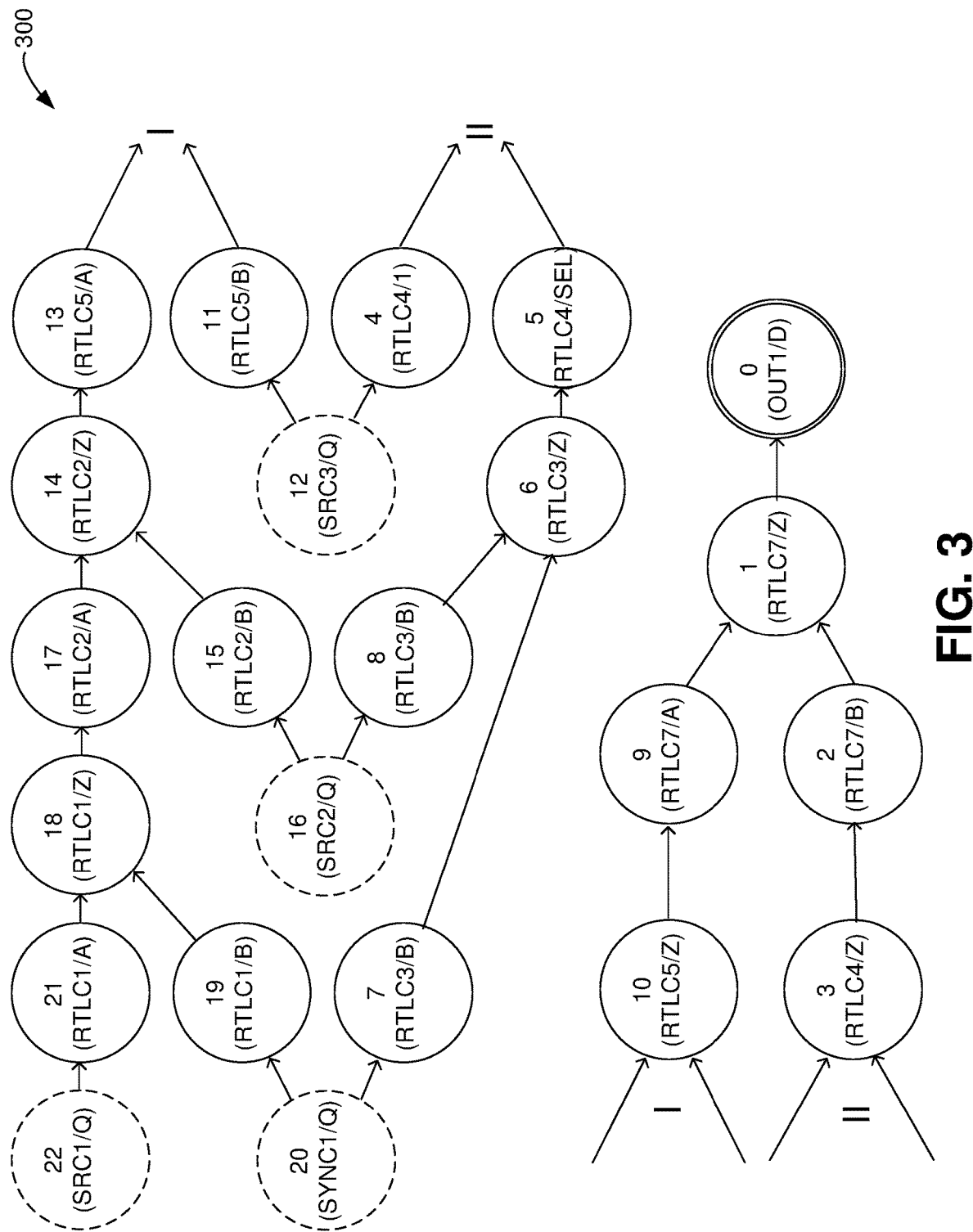
FIG. 3 is a circuit graph for a destination clock domain of the circuit of FIG. 2 for determining blocking values, in accordance with some embodiments of the present disclosure.

FIG. 3 is an example of a circuit graph 300 for the destination clock domain of circuit 200. Circuit graph 300 may be used for determining blocking values in accordance with some embodiments. For example, a process of qualifier blocking value propagation may involve simulating a functionality of a circuit to determine blocking values of qualifiers for the circuit. Notation in the circles of graph 300 includes numbers 1-22, which indicate the topological sorted index of the graph. Topological indices are used for topologically sorted propagation of sources and qualifiers of graph 300. The format of the notation includes the circuit element ID followed by the input or output connection of that element. In embodiments, the technology disclosed may create circuit graph 300 for each destination clock domain (e.g., 106) of the circuit for determining the blocking values. The technology disclosed may use Kosaraju's algorithm, Tarjan's algorithm, or another technique, for example, to create such an graph, which is based on circuit 200. Start points, indicated by a double circle, of the circuit graph may be data inputs, clock inputs, and enable inputs of circuit elements in the destination clock domain. For example, data inputs of circuit 200 are, among others, inputs A and B of AND gates RTLC1, RTLC2, RTLC3, RTLC5, and RTLC7. The clock inputs of circuit 200 is input CP of OUT1. Stop points, indicated by dashed circles, of circuit graph 300 may be synchronizer outputs of the source clock domain and the destination clock domain. For example, a synchronizer output of the source clock domain of circuit 200 is, among others, output Q of flip-flop SRC1. A synchronizer output of the destination clock domain of circuit 200 is, among others, output Q of flip-flop SRC2. As mentioned above, a synchronizer may be a series of two or more flip-flops in a destination clock domain. For example, flip-flop 118 and flip-flop 120 constitute a synchronizer. A synchronizer may be a qualifier. Thus, flip-flop SYNC1 is also a synchronizer. The purpose of a synchronizer (e.g., qualifier) is to reduce the probability that an output signal from the synchronizer becomes metastable. In other words, a synchronizer may produce an output that has negligible probability of becoming metastable, which could cause downstream logic to malfunction.

After creating circuit graph 300, the technology disclosed may then propagate qualifiers on the circuit graph within an allowed sequential depth. An allowed sequential depth is the number of sequential elements in a destination clock domain that can be present between a qualifier signal and destination. In some implementations, it may be specified by the user using a constraint. For each destination clock domain qualifier, the technology disclosed may perform a number of operations for deterministic gates. For an example of one such operation for a deterministic gate (e.g., an AND gate), if a non-merged qualifier is merging with any source, then the technology disclosed may place a blocking value on the output of the deterministic gate (e.g., 0 for an AND gate). In circuit 200, for example, the qualifier output from pin Q of SYNC1 is merging with the source from flip-flop SRC1 (e.g., output pin Q of SRC1 produces the source for input pin A of AND gate RTLC1). Thus, in the case where SYNC1 is a non-merged qualifier (e.g., input D of SYNC1 is not directly connected to a source), the technology disclosed may place a blocking value on output Z of RTLC1. For an example of another such operation, if a merged qualifier is merging with any destination domain signal (e.g., a logic value at an input of a circuit element in the destination clock domain), unconstrained port (e.g., an input having no associated clock), or another qualifier on a deterministic gate, then the technology disclosed may treat it as a passthrough gate to allow the merged value to propagate.

As described above, for each destination clock domain qualifier, the technology disclosed may perform a number of operations for deterministic gates. Additionally, for each destination clock domain qualifier, the technology disclosed may perform a number of operations for signal-type circuit elements. For an example of one such operation, for a multiplexer gate (MUX), if one input of the MUX is a source and another input of the MUX is a destination clock domain signal, unconstrained port, or another qualifier and a select pin of the MUX is driven by a non-merged qualifier, then the technology disclosed may place a value on the select pin of the MUX such that the MUX blocks the source input. For example, input pin "1" of MUX RTLC4 is a source produced at output Q of flip-flop SRC3. The other input of the MUX (input pin "0") is a destination clock domain signal (and also an unconstrained port). The select pin of the MUX is driven by a non-merged qualifier (e.g., from the output pin Z of RTLC3). Accordingly, the technology disclosed may place a value on the select pin of the MUX such that the MUX blocks the source input (e.g., at pin "1").

For an example of another such operation, if one input of the MUX is a merged-qualifier and the other inputs and select line of the MUX are driven by a destination clock domain signal, unconstrained port, or another qualifier, then the technology disclosed may treat the MUX as a pass-through logic to allow the merged-qualifier to propagate through the MUX. Once the qualifier blocking values and pass through logics/MUX are determined, then the blocking values are propagated on the circuit graph.

After qualifier blocking value propagation, the technology disclosed may continue with source propagation in the process for determining blocking values of qualifiers. The technology disclosed may propagate sources along circuit graph 300 to determine the sources that are not blocked by the qualifier. The technology disclosed may further block the sources on each node of the circuit graph based on the following criteria. If a constant value from the qualifier simulation propagates to an input node of the destination clock domain of the circuit graph, then the technology disclosed may mark all the crossings for that destination, for which the particular qualifier is valid, as being synchronized.

The technology disclosed may perform a depth first search (DFS) on circuit graph 300 starting from each destination (e.g., a data input of a destination signal that is a start-point for the circuit graph). Then, on each node of the circuit graph, the technology disclosed may check if a constant (e.g., a blocking value) is propagated on the node. If a constant is propagated on the node, then the technology disclosed may block all the sources passing through the node for which the particular qualifier is valid. If the constant is not propagated on the individual graph node or the sources are not blocked by the qualifier or the propagated value of the qualifier, then the technology disclosed may include determining unsynchronized sources by propagating all the sources from the inputs of the individual graph node to the current node.

If the node is a MUX (e.g., or element producing a MUX-type output), then the technology disclosed may check if a constant value is propagated on the MUX select pin and check if the MUX can block the source coming to the MUX inputs (e.g., the inputs other than the select pin). If yes, then the technology disclosed may block all the sources to the node. If no, then the technology disclosed may propagate all the sources from the MUX inputs. For example, assume that input pin "0" of MUX RTLC4 is a unconstrained signal (e.g., value=1 in FIG. 2). The other input (pin "1") is driven by a source (e.g., output Q of flip-flop SRC3) and the select pin of the MUX is driven by merged-qualifier (e.g., output Z of AND gate RTLC3). Accordingly, the technology disclosed may block the source on the input of the mux if the propagated value on select line of MUX selects the input pin "0" of MUX RTLC4.

The technology disclosed may mark (e.g., label or identify) all sources reaching the destination as being unsynchronized and mark all sources that do not reach the destination (e.g., a data-input of a destination signal that is a start-point for the circuit graph) as being synchronized. In some implementations, the technology disclosed may provide information regarding such marked sources to a memory. In other implementations, the technology disclosed may provide the information to a user interface, such as a display. In the case of unsynchronized sources, the information may describe details regarding the CDC. These details may regard the source in the source clock domain and various paths and elements in the destination clock domain, for example. In the case of synchronized sources, the information may describe details regarding the qualifier, the blocking value of the qualifier, paths and circuit elements associated with the CDC, and the source in the source clock domain. Such information may allow a user to compare the circuit design with the source being blocked to the circuit design with the source being unblocked. For example, the user may review the results to manually analyze the unsynchronized crossings violation(s) to either modify the circuit for correctness or waive (e.g., accept) the violation based on design knowledge.

Figure 4:
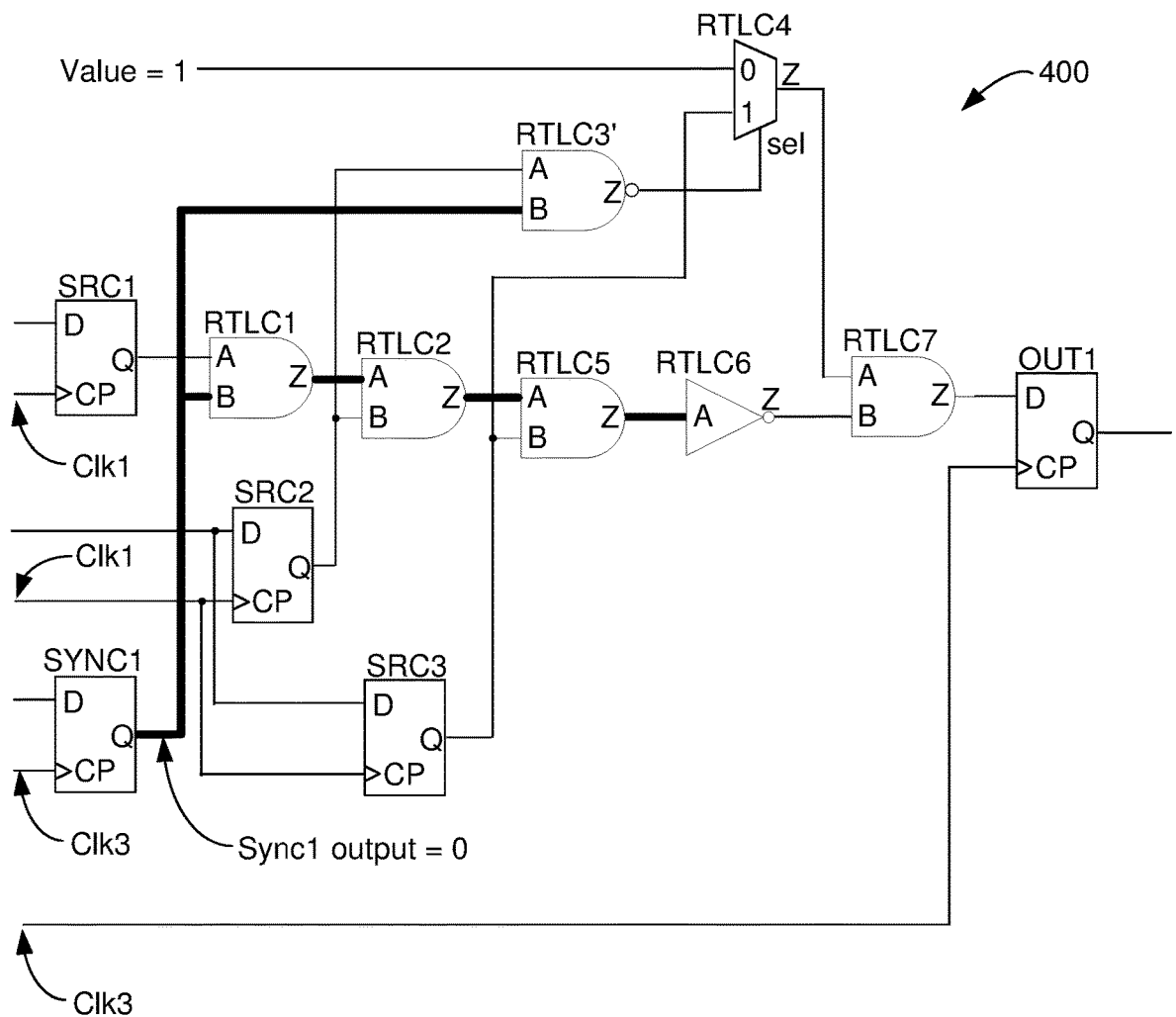
FIG. 4 illustrates various electronic components of a circuit and various blocking sources applied to the electronic components, according to embodiments.

FIG. 4 illustrates a circuit 400 that includes various electronic components and various blocking sources applied to the electronic components, according to embodiments. Circuit 400 is the same as circuit 200 illustrated in FIG. 2, except that AND gate RTLC3 of circuit 200 is replaced with a NAND gate RTLC3' of circuit 400. In the case of circuit 200, SYNC1 blocks SRC2 at AND gate RTLC3 and the merged value of qualifier is propagated to select line of the multiplexer RTLC4 to control the D input on flip-flop OUT1. This corresponds to a data path crossing in a path from SRC2 to OUT1. For example, as illustrated in FIG. 2, a blocking value of logic 0 from SYNC1 results in AND gate RTLC5 and multiplexer RTLC4 blocking source SRC3 from reaching the destination of OUT1. On the other hand, in the case of circuit 400, though SYNC1 blocks SRC2 at NAND gate RTLC3', source SRC3 is not blocked at multiplexer RTLC4 (e.g., because the propagated value of merged qualifier allows the SRC3 to propagate to the output of the MUX). Thus, the D input on flip-flop OUT1 is not controlled by a qualifier in the data path crossing from SRC3 to OUT1. Accordingly, metastability may occur in this data path since there is no qualifier and concomitant qualifier value that can block source SRC3.

Figure 5:
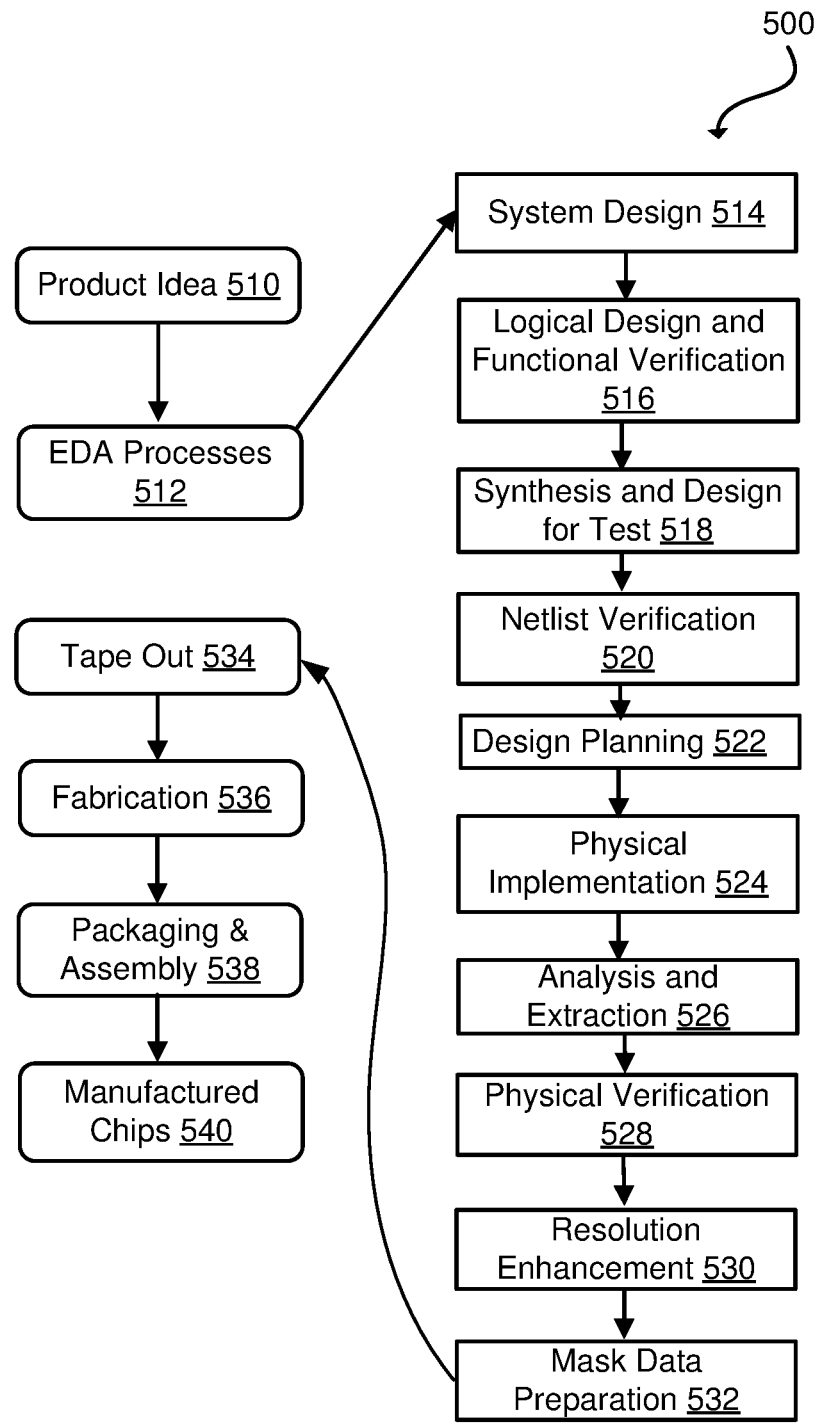
FIG. 5 depicts a flowchart of various processes used during the design and manufacture of an integrated circuit, in accordance with some embodiments of the present disclosure.

FIG. 5 illustrates an example set of processes 500 used during the design, verification, and fabrication of an article of manufacture such as an integrated circuit, to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer. The information is transformed to create an article of manufacture that uses a set of EDA processes 512. For example, processes 512 may include those described above, such as in the description for FIG. 2. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description (e.g., more details for the modules that include the description). The lower levels of abstraction that include less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described may be enabled by EDA products (or tools).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification. At this stage, or generally thereafter, processes 500 may include verifying metastability in clock domain crossings using an automatic determination of blocking values of qualifiers, as described above.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells'), such as size, and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied, if appropriate) for production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all the EDA products described herein, and products used for development of cells for the library and for physical and logical design that use the library.

Figure 6:
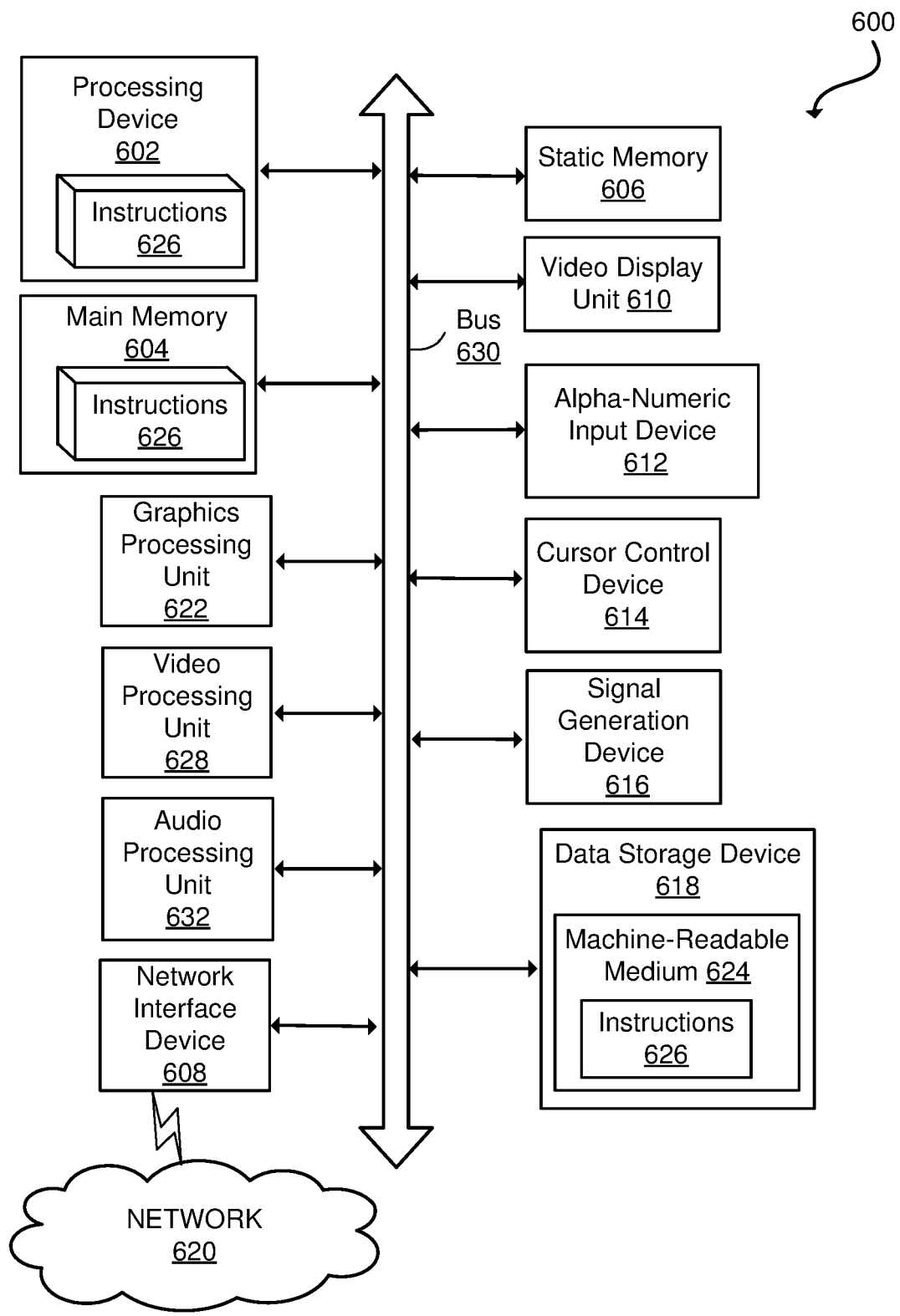
FIG. 6 depicts an abstract diagram of an example computer system in which embodiments of the present disclosure may operate.

FIG. 6 illustrates an example machine of a computer system 600 within which a set of instructions, for causing the machine to perform any one or more of the techniques or methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 may be configured to execute instructions 626 for performing the operations and steps described herein. For example, instructions 626 may direct processing device 602 to perform processes described above, such as in the description for FIG. 2.

Computer system 600 may further include a network interface device 608 to communicate over the network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

Video display unit 610 may be a user interface that provides information to a user of the video display unit. For example, in the case of unsynchronized sources, as described above, the information may describe details regarding a CDC. These details may regard the source in the source clock domain and various paths and elements in the destination clock domain, for example. In the case of synchronized sources, for example, the information may describe details regarding the qualifier, the blocking value of the qualifier, paths and circuit elements associated with the CDC, and the source in the source clock domain. Such information may allow a user to compare the circuit design with the source being blocked to the circuit design with the source being unblocked.

Data storage device 618 may include a machine-readable storage medium 624 (also known as a non-transitory computer-readable medium) on which is stored one or more sets of instructions 626 or software embodying any one or more of the methodologies or functions described herein. Instructions 626 may also reside, completely or at least partially, within main memory 604 and/or within processing device 602 during execution thereof by computer system 600, main memory 604 and processing device 602 and also constitute machine-readable storage media.

In some implementations, instructions 626 include instructions to implement functionality corresponding to the present disclosure. While machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method of determining or verifying metastability for a clock domain crossing (CDC) in a circuit design, the method comprising:
   identifying a first element in the circuit design as a source of the CDC;
selecting a second element in the circuit design to be a qualifier that corresponds to the source;
   determining a blocking value of the qualifier that can functionally block the source;
   as a result of determining the blocking value, identifying the CDC as being a synchronized crossing where metastability is not produced; and
   providing a user interface with information regarding at least one of (i) the qualifier, (ii) the blocking value of the qualifier, (iii) the CDC, and (iii) the source to allow a user to review (a) the circuit design with the source being blocked and (b) the circuit design with the source being unblocked.

2. The computer-implemented method of claim 1, further comprising:
   identifying a third element in the circuit design as a second source of a second CDC;
   searching for a candidate qualifier that can functionally block the second source;
   as a result of failing to find the candidate qualifier, identifying the second CDC as having an unsynchronized crossing where metastability is produced as a result of the second CDC in a fourth element in the circuit design.

3. The computer-implemented method of claim 1, wherein the CDC comprises a signal path between the first element, which is operated by a first clock, and a circuit element that is operated by a second clock, which is asynchronous with respect to the first clock.

4. The computer-implemented method of claim 1, wherein determining the blocking value of the qualifier comprises:
   for a destination clock domain in the circuit design, creating a circuit graph based, at least in part, on the circuit design, the circuit graph including start points and stop points, wherein the start points are (i) data inputs, (ii) clock inputs, or (iii) enable inputs of circuit elements in the destination clock domain and the stop points are synchronizer outputs of (i) the destination clock domain or (ii) a source clock domain in the circuit design;
   traversing the circuit graph to mark all nodes of the circuit graph that reside in a source-destination path of the CDC; and
   determining the blocking value of the qualifier based at least in part on the marked nodes of the circuit graph, the start points, and the stop points.

5. The computer-implemented method of claim 4, further comprising:
   performing a dynamic synchronization analysis on a deterministic gate of the circuit design by:
      analyzing a gate structure of the deterministic gate and incoming signals, including the source, applied to the deterministic gate;
      analyzing interactions among the incoming signals; and
      based at least in part on analyzing (i) the gate structure of the deterministic gate, (ii) the incoming signals applied to the deterministic gate, and (iii) the interactions among the incoming signals, determining whether the source can be directly blocked by the qualifier or by a propagated blocking value of the qualifier.

6. The computer-implemented method of claim 5, further comprising:
   propagating multiple sources across the circuit graph;
   performing value propagation by propagating the blocking value of the qualifier to an input node in the destination clock domain of the circuit graph;
   marking all the clock domain crossings for the input node in the destination clock domain of the circuit graph as being synchronized;
   performing a depth first search (DFS) to determine if the blocking value is propagated on a particular node of the circuit graph;
   when the blocking value is propagated on the particular node of the circuit graph, blocking all sources passing through the particular node of the circuit graph; and
   when the blocking value is not propagated on the particular node of the circuit graph, propagating all sources from inputs of the particular node of the circuit graph to a different node.

7. The computer-implemented method of claim 6, further comprising:
   when the particular node of the circuit graph is a MUX, determining if the blocking value is propagated on a select line of the MUX;
   determining if the MUX can block a source that is applied to inputs of the MUX;
   if the blocking value is propagated on the select line of the MUX and if the MUX can block the source that is applied to the inputs of the MUX, blocking all the sources applied to the particular node of the circuit graph; and
   if the blocking value is not propagated on the select line of the MUX and if the MUX cannot block the source that is applied to the inputs of the MUX, propagating all the sources applied to the inputs of the MUX.

8. The method of claim 6, further comprising marking all sources reaching the input node in the destination clock domain of the circuit graph as being unsynchronized and marking all the sources that do not reach the input node in the destination clock domain of the circuit graph as being synchronized.

9. The computer-implemented method of claim 4, further comprising:
configuring a multiplexer gate (MUX) of the circuit design to block the source by performing a dynamic synchronization analysis on the MUX, the dynamic synchronization analysis comprising:
applying the source to an input of the MUX;
applying (i) a signal of the destination clock domain, (ii) an unconstrained port signal, or (iii) another qualifier of the destination clock domain to another input of the MUX; and
applying the blocking value of the qualifier to a select pin of the MUX.

10. A system comprising a processor and a memory, the memory storing instructions that, when executed by the processor, cause the processor to:
identify a first element in a circuit design as a source of a clock domain crossing (CDC);
select a second element in the circuit design to be a qualifier that corresponds to the source;
determine a blocking value of the qualifier that can functionally block the source;
as a result of determining the blocking value, identify the CDC as being a synchronized crossing where metastability is not produced as a result of the CDC; and
provide a user interface with information regarding at least one of (i) the qualifier, (ii) the blocking value of the qualifier, (iii) the CDC, and (iii) the source to allow a user to review (a) the circuit design with the source being blocked and (b) the circuit design with the source being unblocked.

11. The system of claim 10, wherein the instructions further cause the processor to:
identify a third element in the circuit design as a second source of a second CDC;
search for a candidate qualifier that can functionally block the second source;
as a result of failing to find the candidate qualifier, identify the second CDC as having an unsynchronized crossing where metastability is produced as a result of the second CDC in a fourth element in the circuit design.

12. The system of claim 10, wherein the CDC comprises a signal path between the first element, which is operated by a first clock, and a circuit element that is operated by a second clock, which is asynchronous with respect to the first clock.

13. The system of claim 10, wherein the instructions further cause the processor to determine the blocking value of the qualifier by:
for a destination clock domain in the circuit design, creating a circuit graph based, at least in part, on the circuit design, the circuit graph including start points and stop points, wherein the start points are (i) data inputs, (ii) clock inputs, or (iii) enable inputs of circuit elements in the destination clock domain and the stop points are synchronizer outputs of (i) the destination clock domain or (ii) a source clock domain in the circuit design;
traversing the circuit graph to mark all nodes of the circuit graph that reside in a source-destination path of the CDC; and
determining the blocking value of the qualifier based at least in part on the marked nodes of the circuit graph, the start points, and the stop points.

14. The system of claim 13, wherein the instructions further cause the processor to:
perform a dynamic synchronization analysis on a deterministic gate of the circuit design by:
analyzing a gate structure of the deterministic gate and incoming signals, including the source, applied to the deterministic gate;
analyzing interactions among the incoming signals; and
based at least in part on analyzing (i) the gate structure of the deterministic gate, (ii) the incoming signals applied to the deterministic gate, and (iii) the interactions among the incoming signals, determining whether the source can be directly blocked by the qualifier or by a propagated blocking value of the qualifier.

15. The system of claim 13, wherein the instructions further cause the processor to:
configure a multiplexer gate (MUX) of the circuit design to block the source by performing a dynamic synchronization analysis on the MUX, the dynamic synchronization analysis comprising:
applying the source to an input of the MUX;
applying (i) a signal of the destination clock domain, (ii) an unconstrained port signal, or (iii) another qualifier of the destination clock domain to another input of the MUX; and
applying the blocking value of the qualifier to a select pin of the MUX.

16. A non-transitory computer readable medium comprising stored instructions, which when executed by a processor, cause the processor to:
identify a first element in a circuit design as a source of a clock domain crossing (CDC);
select a second element in the circuit design to be a qualifier that corresponds to the source;
determine a blocking value of the qualifier that can functionally block the source;
as a result of determining the blocking value, identify the CDC as being a synchronized crossing where metastability is not produced as a result of the CDC; and
provide a user interface with information regarding at least one of (i) the qualifier, (ii) the blocking value of the qualifier, (iii) the CDC, and (iii) the source to allow a user to review (a) the circuit design with the source being blocked and (b) the circuit design with the source being unblocked.

17. The non-transitory computer readable medium of claim 16, wherein the instructions further cause the processor to:
identify a third element in the circuit design as a second source of a second CDC;
search for a candidate qualifier that can functionally block the second source;
as a result of failing to find the candidate qualifier, identify the second CDC as having an unsynchronized crossing where metastability is produced as a result of the second CDC in a fourth element in the circuit design.

18. The non-transitory computer readable medium of claim 16, wherein the instructions further cause the processor to determine the blocking value of the qualifier by:
for a destination clock domain in the circuit design, creating a circuit graph based, at least in part, on the circuit design, the circuit graph including start points and stop points, wherein the start points are (i) data inputs, (ii) clock inputs, or (iii) enable inputs of circuit elements in the destination clock domain and the stop points are synchronizer outputs of (i) the destination clock domain or (ii) a source clock domain in the circuit design;

traversing the circuit graph to mark all nodes of the circuit graph that reside in a source-destination path of the CDC; and determining the blocking value of the qualifier based at least in part on the marked nodes of the circuit graph, the start points, and the stop points.

19. The non-transitory computer readable medium of claim 18, wherein the instructions further cause the processor to:

perform a dynamic synchronization analysis on a deterministic gate of the circuit design by:

analyzing a gate structure of the deterministic gate and incoming signals, including the source, applied to the deterministic gate;

analyzing interactions among the incoming signals; and based at least in part on analyzing (i) the gate structure of the deterministic gate, (ii) the incoming signals applied to the deterministic gate, and (iii) the interactions among the incoming signals, determining whether the source can be directly blocked by the qualifier or by a propagated blocking value of the qualifier.

20. The non-transitory computer readable medium of claim 18, wherein the instructions further cause the processor to:

configure a multiplexer gate (MUX) of the circuit design to block the source by performing a dynamic synchronization analysis on the MUX, the dynamic synchronization analysis comprising:

applying the source to an input of the MUX;

applying (i) a signal of the destination clock domain, (ii) an unconstrained port signal, or (iii) another qualifier of the destination clock domain to another input of the MUX; and applying the blocking value of the qualifier to a select pin of the MUX.

* * * * *